(12) United States Patent
Ozersky et al.

(10) Patent No.: US 9,045,875 B2
(45) Date of Patent: Jun. 2, 2015

(54) DEVICE FOR OIL SPILL CLEANUP

(71) Applicant: INKASTRANS (CANADA) LTD., Toronto, Ontario (CA)

(72) Inventors: Alexander Ozersky, Ontario (CA); David Khazanski, Richmond Hill (CA); Jakov Kogan, Montreal (CA)

(73) Assignee: INKASTRANS (CANADA) LTD., Toronto (CA)

(*) Notice: Subject to any disclaimer, the term of this patent is extended or adjusted under 35 U.S.C. 154(b) by 220 days.

(21) Appl. No.: 13/760,376

(22) Filed: Feb. 6, 2013

(65) Prior Publication Data

US 2014/0217004 A1 Aug. 7, 2014

(51) Int. Cl.
*E02B 15/04* (2006.01)
*E02B 15/10* (2006.01)

(52) U.S. Cl.
CPC ............ *E02B 15/045* (2013.01); *E02B 15/101* (2013.01)

(58) Field of Classification Search
CPC ..... E02B 15/045; E02B 15/101; C02F 1/281; C02F 1/285; C02F 1/286; C02F 1/288; C02F 2101/32; C02F 2103/007; B01J 20/28033; B01J 20/28035; B01J 20/28038
USPC ................. 210/242.4, 282, 484, 502.1, 924
See application file for complete search history.

(56) References Cited

U.S. PATENT DOCUMENTS

| | | | |
|---|---|---|---|
| 3,537,587 A | 11/1970 | Kain | |
| 3,539,013 A | 11/1970 | Smith | |
| 3,770,575 A * | 11/1973 | Ball | 162/100 |
| 3,791,990 A * | 2/1974 | Fischer | 502/404 |
| 4,031,839 A | 6/1977 | Pedone | |
| 4,069,821 A | 1/1978 | Fitzgerald et al. | |
| 4,340,486 A | 7/1982 | Swanson | |
| 4,555,338 A | 11/1985 | Marchionda | |
| 4,832,852 A * | 5/1989 | Wells et al. | 210/671 |
| 4,840,734 A * | 6/1989 | Johnson | 210/660 |
| 5,186,831 A | 2/1993 | DePetris | |
| 5,200,083 A | 4/1993 | Kaylor | |
| 5,352,497 A | 10/1994 | Patel | |
| 5,391,415 A * | 2/1995 | Bair | 428/74 |
| 5,403,478 A | 4/1995 | Brinkley | |
| 5,407,575 A | 4/1995 | Vinsonhaler | |
| 5,421,281 A | 6/1995 | Beyrouty | |
| 5,451,325 A | 9/1995 | Herkenberg | |
| 5,453,191 A | 9/1995 | McCrory et al. | |
| 5,834,385 A | 11/1998 | Blaney et al. | |

(Continued)

FOREIGN PATENT DOCUMENTS

CA 2406248 A1 4/2004

OTHER PUBLICATIONS

International Search Report for PCT/CA2014/050075 dated May 14, 2014.

*Primary Examiner* — Matthew O Savage
(74) *Attorney, Agent, or Firm* — Bacon & Thomas, PLLC

(57) ABSTRACT

An absorbent pad for absorption and containment of oil based products. The absorbent pad includes a plurality of absorbent modules contained within a hydrophobic, porous and flexible top and base material, each absorbent module having a hydrophobic, oil absorbent material sealed therein, each of the plurality of absorbent modules being spaced from adjacent absorbent modules by a gap to allow the absorbent modules to flex and twist with respect to each other as well as permitting oil-based products to flow up through the gap between adjacent absorbent modules.

19 Claims, 17 Drawing Sheets

(56) References Cited

U.S. PATENT DOCUMENTS

| | | |
|---|---|---|
| 5,902,664 A | 5/1999 | Gurfinkel |
| 5,906,478 A | 5/1999 | Wagner |
| 6,027,652 A | 2/2000 | Hondroulis et al. |
| 6,326,070 B1 | 12/2001 | Sodergren |
| 6,723,791 B2 | 4/2004 | Rink et al. |
| 7,048,878 B2 | 5/2006 | Rink et al. |
| 7,229,560 B2 | 6/2007 | Rink et al. |
| 7,410,577 B2 | 8/2008 | Broje |
| 7,655,149 B1 * | 2/2010 | Shaffer et al. ............... 210/691 |
| 2006/0191835 A1 * | 8/2006 | Petrik et al. ............... 210/242.4 |
| 2008/0211140 A1 | 9/2008 | Burns et al. |
| 2009/0137177 A1 | 5/2009 | Jonker |
| 2012/0031848 A1 | 2/2012 | Sherman |

\* cited by examiner

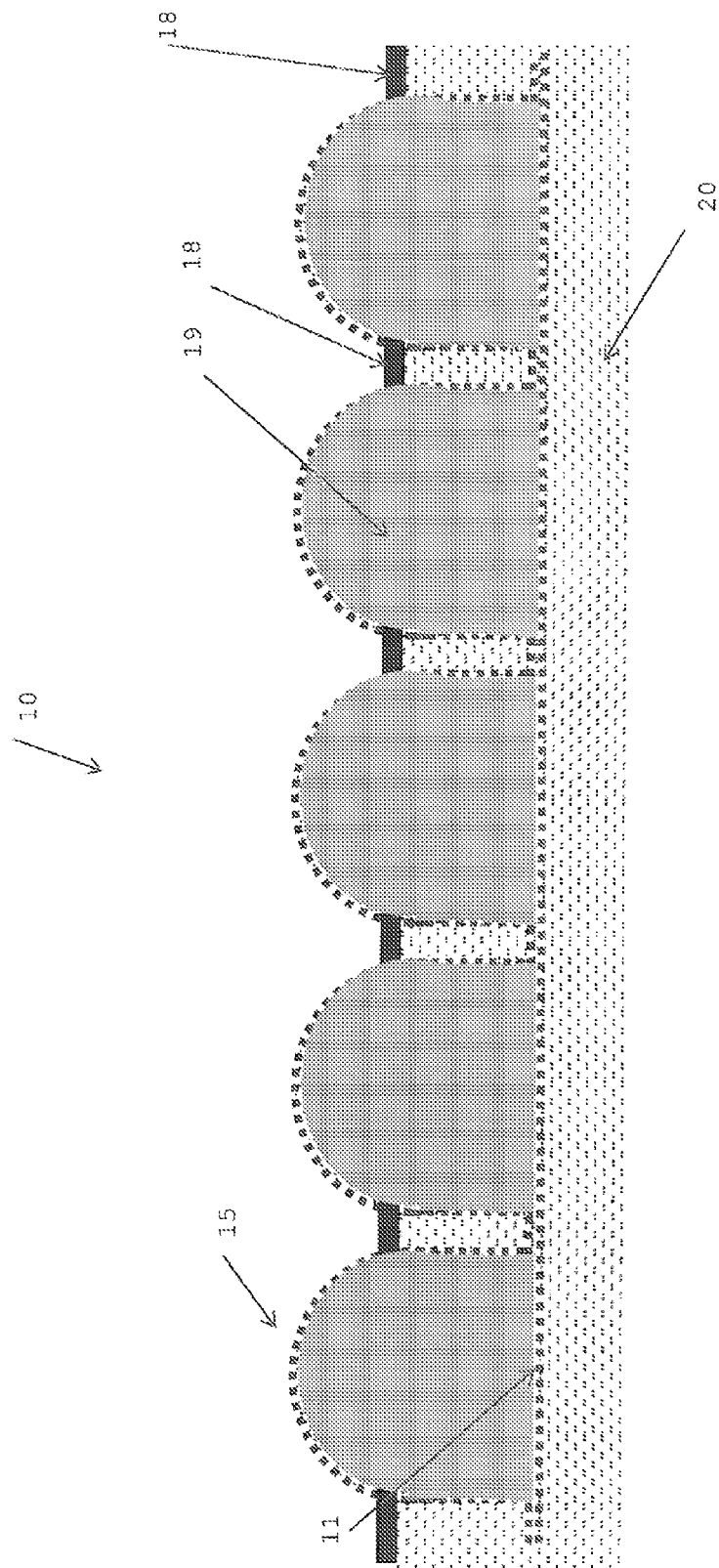

DEVICE FOR OIL SPILL CLEANUP

FIELD

The present disclosure relates to an absorption pad for absorbing oil or liquid oil products, and is specifically directed to a device for absorbing oil spills on water or other surfaces. The device can be used particularly for removing tramp oils floating on the surface of metalworking fluids or coolants, as well for absorbing oil on solid surfaces and for absorbing oil, water and water soluble liquids on solid surfaces.

BACKGROUND

Oil sorbent devices are very well known in the art. They come in shapes of sheets, sweeps, blankets, pads, pillows, mats, etc., in many different sizes. Rather thin (normally no thicker than ½ inch) nonwoven polypropylene or cotton sheets, sweeps, blankets, pads are commonly used for collection of oil on solid surfaces and water, and widely described in the suppliers brochures and literature (e.g. The Basics of Oil Spill Cleanup by Mery Fingas, The Second Edition, pp. 105-106).

Major advantages of these sheets include the ease of the use and the short time need to completely fill the volume of the sheet with the absorbed liquid. The high efficiency of oil sorption of these types of sheets is due to the fact that they are relatively thin and light. These types of sheets, when placed on water covered by oil, do not sink into the water, but rather their bottom surfaces tend to lie on the top of the oil film so that penetration of the oil into the sheet is through the bottom surface of the sheet and takes place fairly quickly. When placed on a thin oil layer on water, the pad absorbs the oil through its bottom surface so that further oil penetration occurs very slowly through its edges after it has sunk down a little. Further disadvantages of these types of oil absorption devices are their rather small volume (because of the small thickness) and accordingly a small potential amount of absorbed oil, and relatively high price of nonwovens, which results in high cost of oil retrieval. Besides, being very light these pads may be blown and drifted away by wind and water stream.

Another type of the sorbent devices of this kind are pads having porous flexible casing filled with oil sorbent material, and described in the U.S. Pat. No. 5,186,831 and U.S. Pat. No. 5,407,575. These pads are thicker than the nonwoven sorbent sheets and accordingly have higher volume, and therefore greater oil sorption potential. The sorbent fillers in these pads are less expensive than material of sorbent nonwoven pads, which means lower price per the weight unit of the device, and theoretically less oil retrieval cost. However, the pads disclosed in these publications exhibit low oil sorption efficiency. The problem stems from the fact that the pads are quite thick and relatively heavy, with low surface areas so that when placed on oil on a body of water the pads sink lower into the water causing oil to be displaced from under the bottom of the pad with the oil contacting the pad around its edges resulting in the oil penetrating into the pad through a very small area on the pad edges.

Another known oil absorbent pad are quilted pads having top and bottom surfaces of a flexible casing filled with oil absorbent material with the top and bottom stitched together at different positions to provide a pad with the oil absorbent material confined so that it does not move around and bunch up between the top and bottom casing material. A disadvantage of these quilted pads is that by stitching the top and bottom materials together in period locations this produce pockets with convex downward bottom blocks. In the case of oil on water it translates into much deeper submersion of these quilted pads into water in comparison with flat pads of the same size and weight. If the depth of penetration of the quilted pads into water is larger than the oil layer thickness, oil sorption goes only through lines of oil contact with side surfaces of the quilted blocks.

SUMMARY

The present disclosure discloses an absorbent pad for absorption and containment of oil based products. The device comprises a hydrophobic, porous, continuous and flexible surface conforming base and a plurality of spaced absorbent modules affixed to the surface conforming base. Each absorbent module has a hydrophobic oil absorbent material sealed between a hydrophobic, porous and flexible material and the surface conforming base, the hydrophobic, porous and flexible material defining sides and a top of each module and the surface conforming bas defining a bottom of each said module, the bottom of each said module being substantially planar and extending from one the sides of the respective module to the other side of the respective module, the flexible surface conforming base including gap facing portions that extend across the gaps from the side of one of the modules to the side of an adjacent module, whereby the entire flexible surface conforming base including the gap facing portions can assume a substantially planar configuration when placed upon a substantially planar surface, and each absorbent module has a center of gravity that is spaced upwardly from said surface conforming base, the gap facing portions of the flexible surface conforming base containing centers of twist of the said modules. The side of each absorbent module is spaced from the side of an adjacent absorbent modules by a gap of pre-selected width on the surface conforming base. The gap is sufficiently large to allow the plurality of spaced absorbent modules to twist and flex with respect to each other along the gap facing portions of the flexible surface conforming base and to allow oil-based products to flow up through the gap between adjacent absorbent modules from the bottom of the modules to the top of the modules. When placed on a surface containing oil based products, the oil based products pass through the surface conforming base into the absorbent modules, and oil based products pass up through the gap between neighbouring absorbent modules and passes into the absorbent modules through the hydrophobic, porous and flexible material through sides of the absorbent module. Water is blocked from entering the absorbent modules by the hydrophobic, porous and flexible surface conforming base and the hydrophobic, porous and flexible material.

A further understanding of the functional and advantageous aspects of the disclosure can be realized by reference to the following detailed description and drawings.

BRIEF DESCRIPTION OF THE DRAWINGS

Embodiments of the absorbent pads will now be described, by way of example only, with reference to the drawings, in which:

FIG. 3b, FIG. 3c, and FIG. 3d show cross-sectional views

DETAILED DESCRIPTION

Figure 1A:
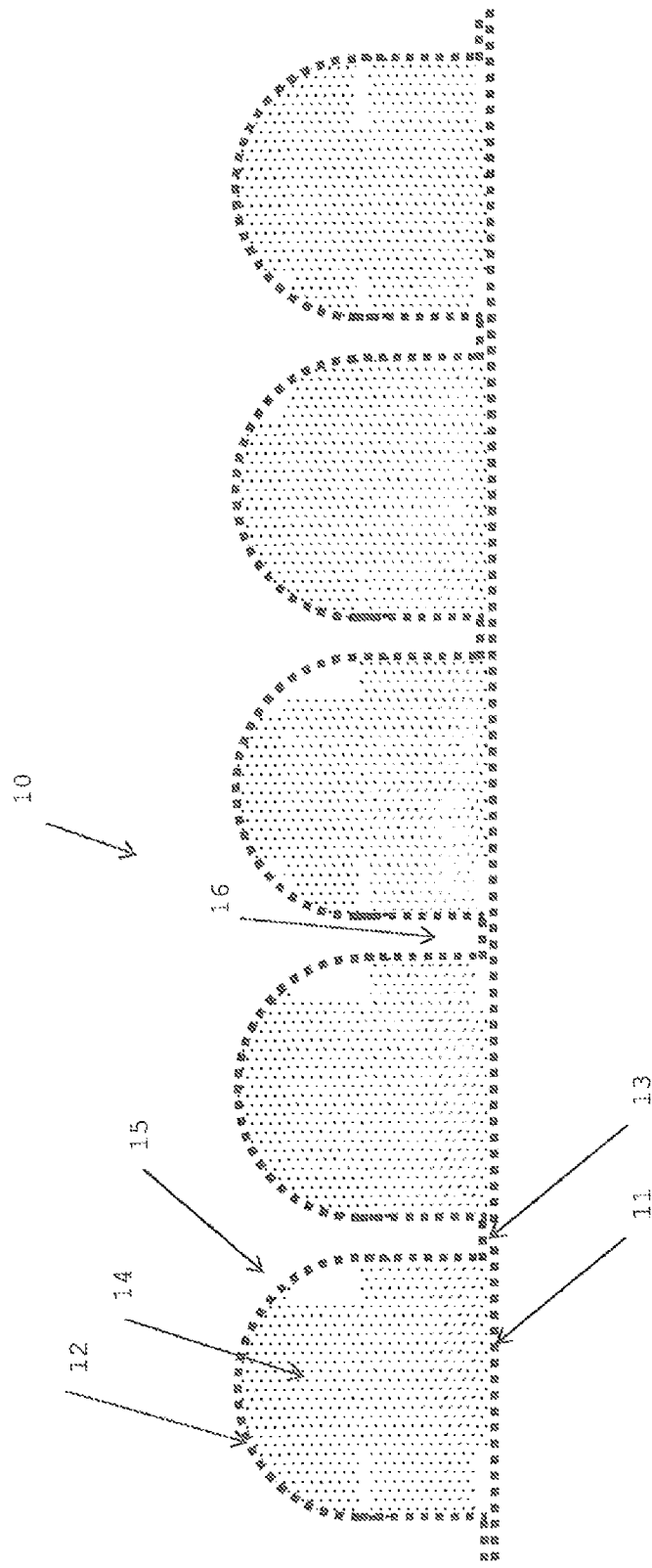
FIG. 1a show cross-sectional view and FIG. 2a shows isometric projection of embodiments of oil absorbent pad.

Various embodiments and aspects of the disclosure will be described with reference to details discussed below. The following description and drawings are illustrative of the disclosure and are not to be construed as limiting the disclosure. The drawings are not to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the terms "example", "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

Broadly speaking, the oil absorbent device includes a hydrophobic, porous, continuous, and flexible surface conforming base and a plurality of spaced absorbent modules affixed to the surface conforming base. The phrase "flexible surface conforming base" means when the pad is placed on a surface, whether rigid (such as a solid surface), or a deformable surface (such as water), the base is flexible and adapts to the shape of the solid or deformable surface so that generally the entire base remains in physical contact with the surface. Each absorbent module has a hydrophobic oil absorbent material sealed between a hydrophobic, porous and flexible material and the surface conforming base and each absorbent module is spaced from adjacent absorbent modules by a gap of pre-selected width on the surface conforming base. The gap is sufficiently large to allow the plurality of spaced absorbent modules to twist and flex with respect to each other and to allow oil-based products to flow up through the gap between adjacent absorbent modules. When placed on a surface containing oil based products, the oil based products pass through the surface conforming base into the absorbent modules, and oil based products pass up through the gap between neighbouring absorbent modules and passes into the absorbent modules through the hydrophobic, porous and flexible material through sides of the absorbent module.

Figure 2A:
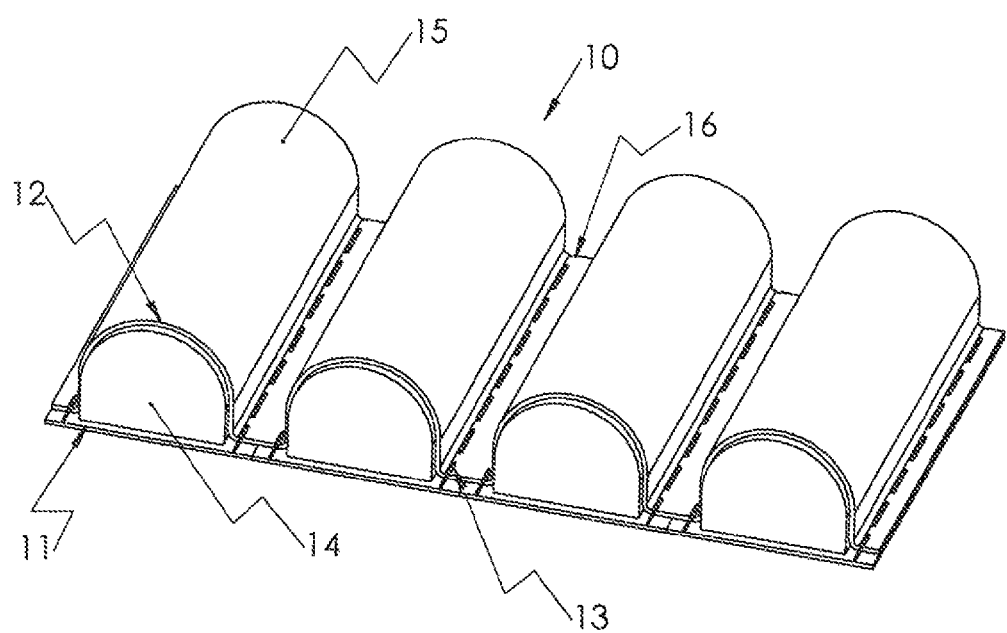

More particularly, referring to FIG. 1a and FIG. 2a an embodiment of a sorbent pad 10 comprises a base 11 made of a flexible and porous bottom or base material, or fabric (the hydrophobic, porous and flexible surface conforming base as mentioned above) brought together with, and fastened to, a hydrophobic, porous, continuous, and flexible material or fabric 12 (as mentioned above) by parallel seams 13. The fastening of the fabrics 11 and 12 together may be done by any one or combination of adhesives, heat-sealing, ultrasonic, sewing or the like. It is noted other methods may be used to fasten the fabrics 11 and 12 together, and the above list simply shows some of examples. The cross sectional length of the top fabric 12 is larger than the cross sectional length of the bottom fabric 11 by about 10 to about 1000%. The sorbent modules 15 produced by the bottom fabric 11 and top fabric 12 attached to one another along the seams 13 are filled with a hydrophobic sorbent material 14 selected to absorb oil/hydrocarbons, and the opened edges of the modules 15, after they have been filled, are sealed in any one of the same ways used to produce seams 13. Pad 10 is produced so that the sorbent modules 15 are spaced one from another by channels 16.

The cross sectional base width of the modules 15 may range from about 1 to about 10 inches and distance (i.e., gap) between the modules 15 defined by the width of the channels 16 may range from about 0.25 to about 1 inch.

The sorbent material 14 may be any hydrophobic sorbent substance, including natural or synthetic solid materials, fibers, granules, and powders. The type the sorbent core material is defined by manufacture preference and may depend on the local availability, cost, and performance. The sorbent material 14 may be made from unstructured hydrophobic fibers, which are porous fibers, permeable to oil and impermeable to water. The fibers may be synthetic fibers, such as, but not limited to, polypropylene, polyethylene, etc., or they may be natural organic fibers, such as, but not limited to, wool, feather, hairs, raw cotton.

A preferred natural fiber may be raw cotton waste (cotton gin trash, cotton motes, comber noils, etc.), or natural mineral fibers such as, but not limited to, treated perlite, vermiculite, sepilolite, diatomite, etc.

Figure 1B:
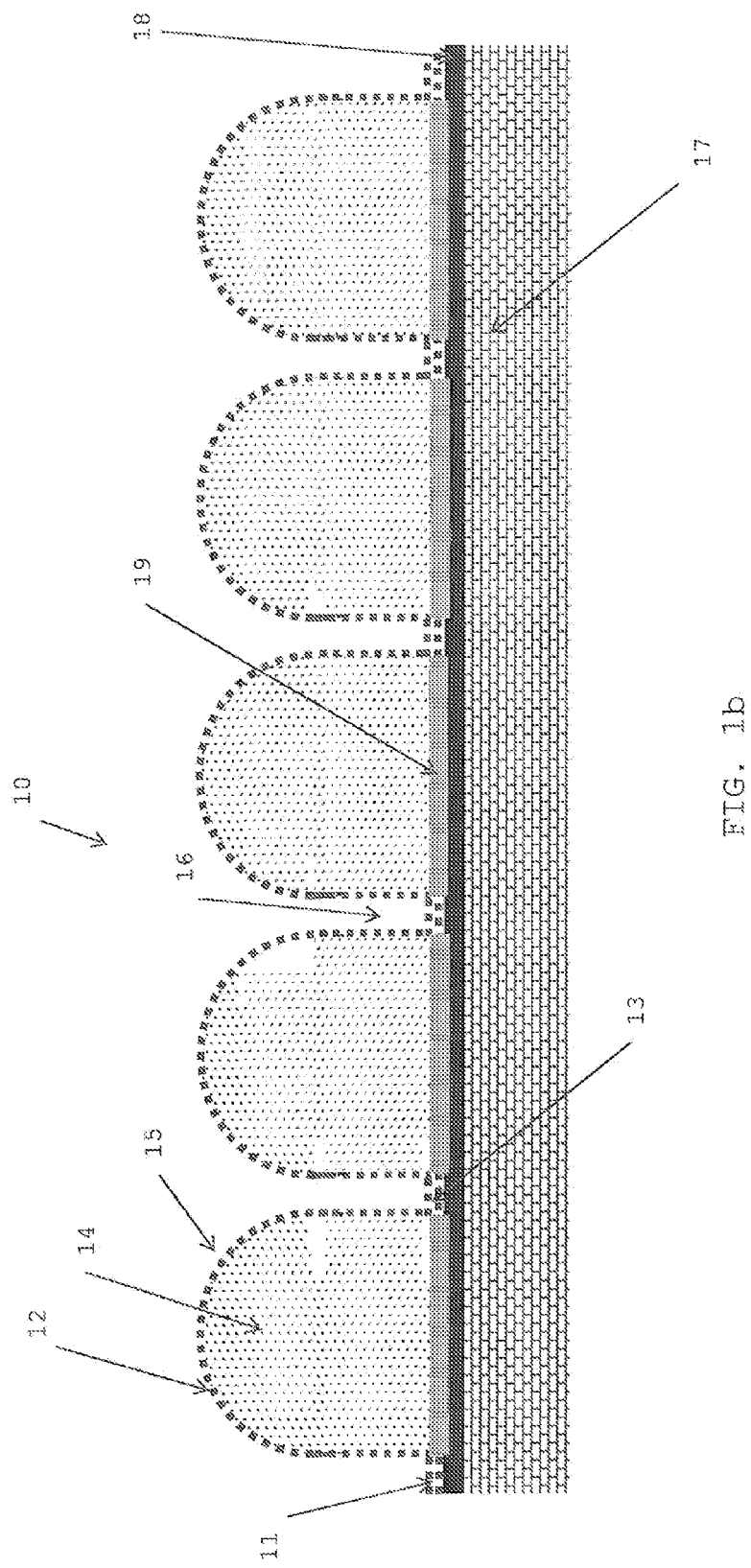
FIG. 1b, FIG. 1c and FIG. 1d show cross-sectional views
Figure 1C:
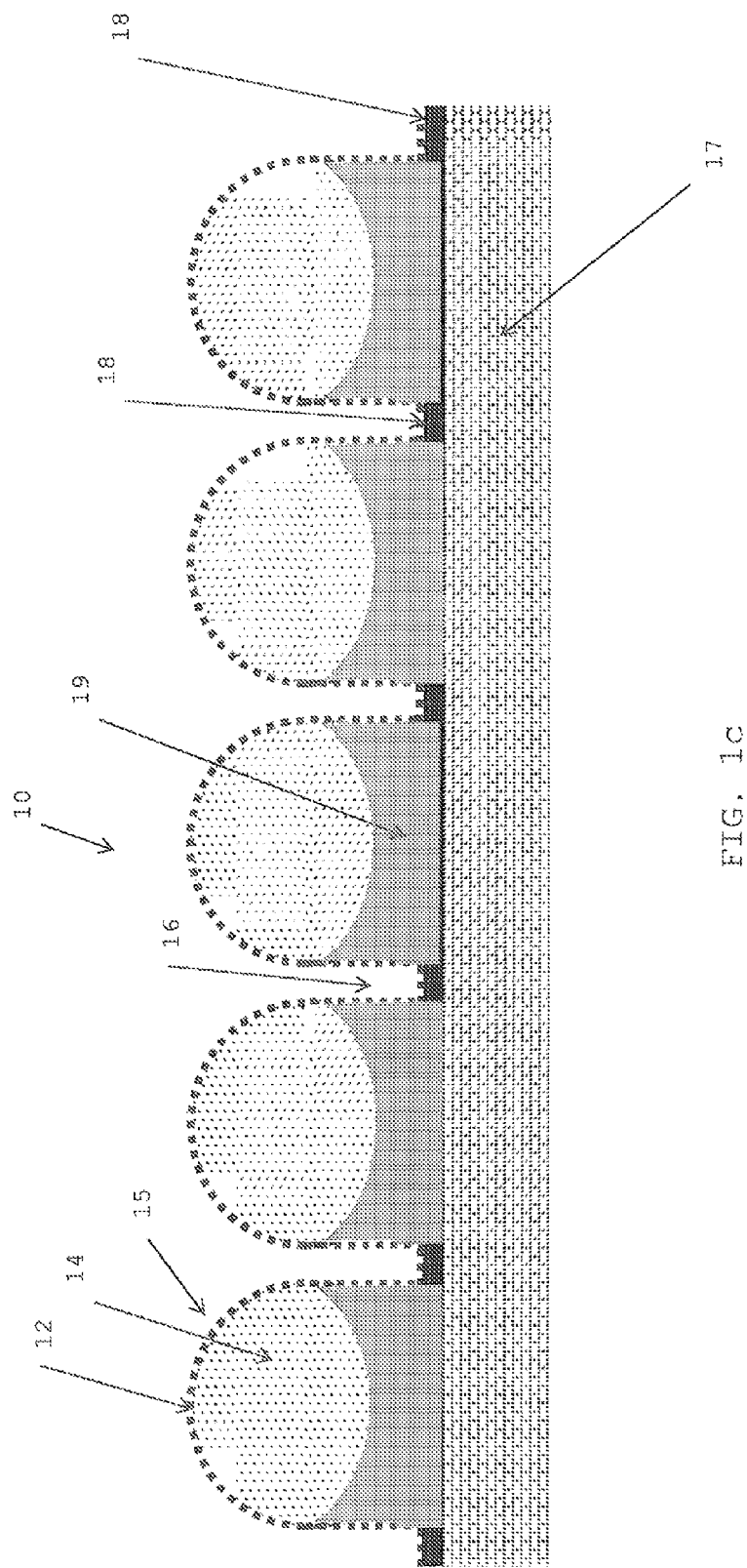
Figure 1D:
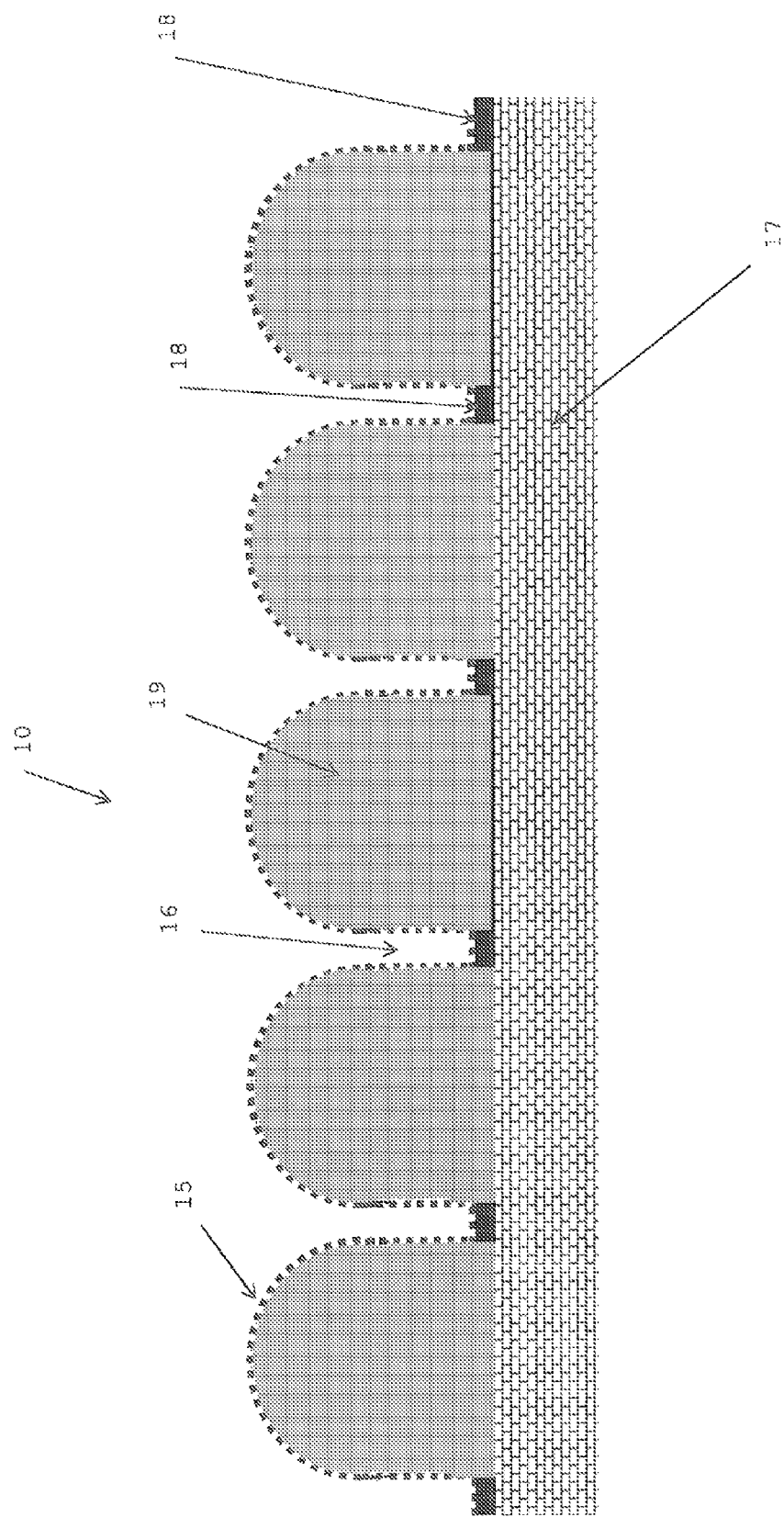
Figure 2B:
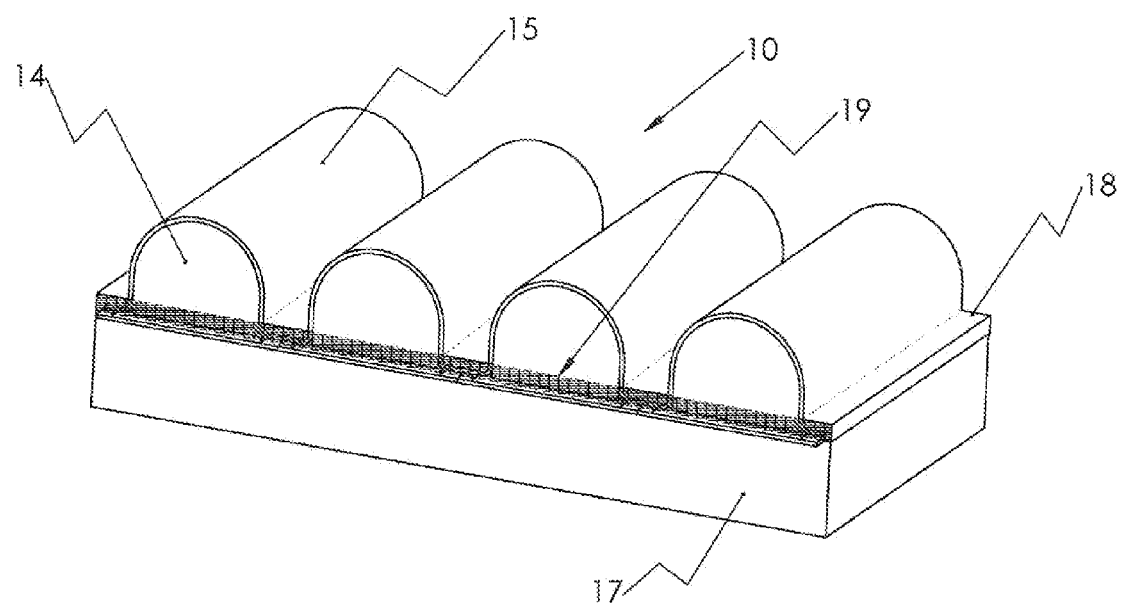
FIG. 2b, FIG. 2c and FIG. 2d show accordingly isometric projections of embodiments of oil absorbent pad for absorbing oil on a solid surface (floor, road, etc.) as the device absorbs oil and dips onto the solid surface.
Figure 2C:
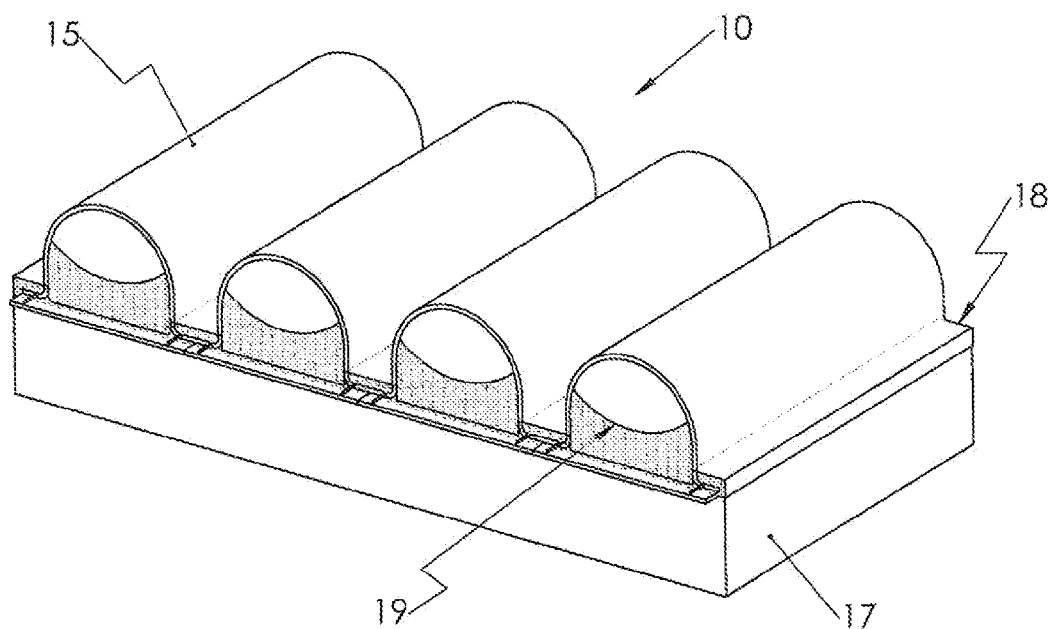
Figure 2D:
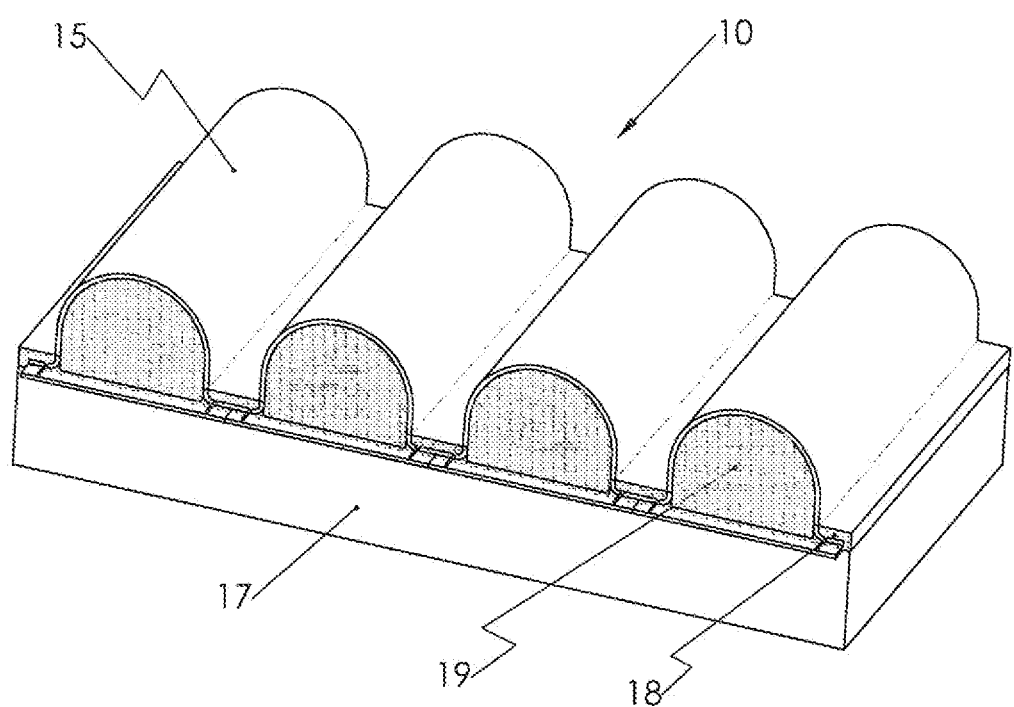

When absorbent pad 10 is placed on a solid surface 17 covered by an oil layer 18 (FIG. 1b and FIG. 2b) it absorbs the oil located below bottom fabric 11 up through the bottom fabric. The absorbed oil 19 is drawn up through bottom fabric 11 into the bottom of modules 15 where it is absorbed and encapsulated by the sorbent material 14. As oil is drawn into pad 10, the pad dips until it lays on the solid surface. As pad 10 sinks below the surface, oil layer 18, located under the pad and surrounding it, flows into the channels 16 and is absorbed by the side surfaces of the modules 15 thereby filling the modules (FIG. 1b, FIG. 1c, FIG. 1d and accordingly FIG. 2b, FIG. 2c, FIG. 2d).

When pad 10 is deployed for absorbing mixtures of other liquids along with oil, (such as water or water soluble liquids) on solid surfaces, the sorbent material 14 may be a hydrophilic sorbent material, or it may be a mixture of hydrophobic and hydrophilic materials in any proportion, including natural or synthetic solid materials, fibers, granules, and powders.

Figure 3A:
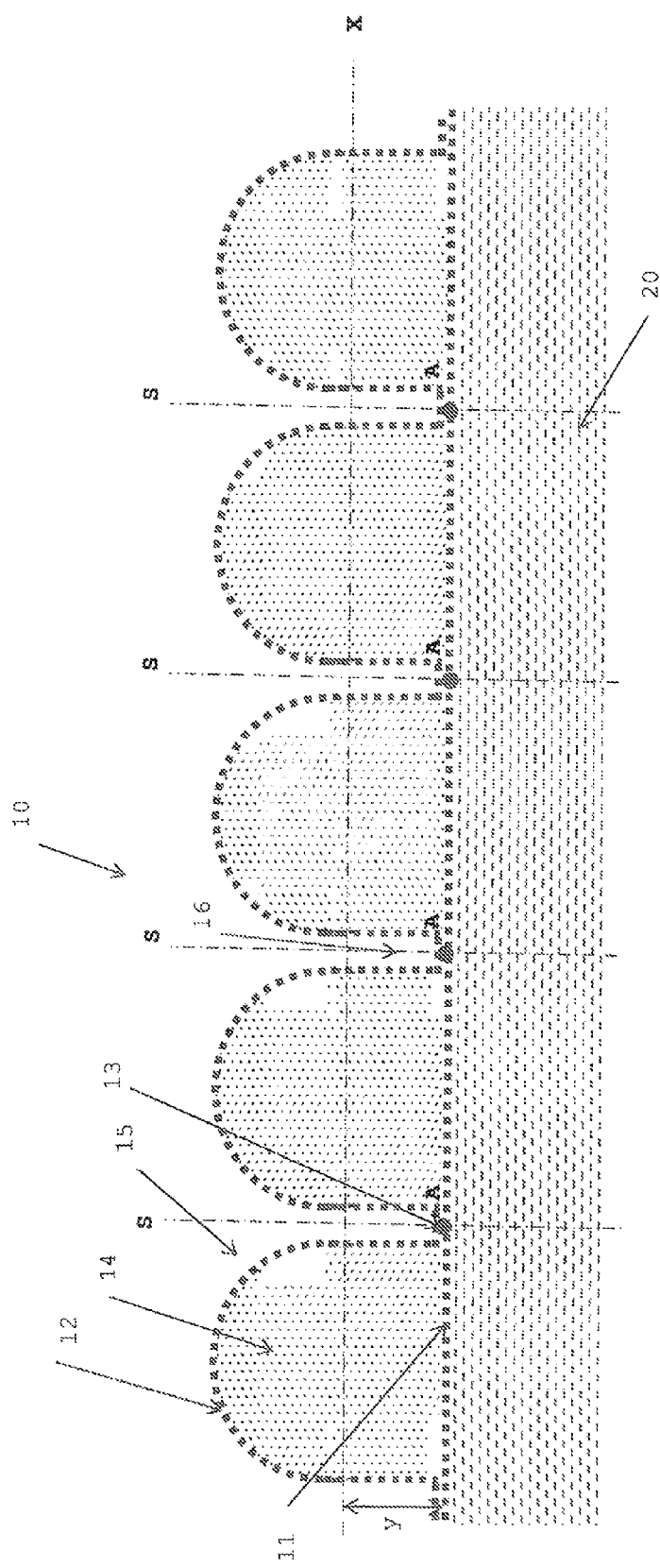
FIG. 3a shows cross-sectional view of embodiment of oil absorbing pad, showing the pad as it lies on calm water.
Figure 3B:
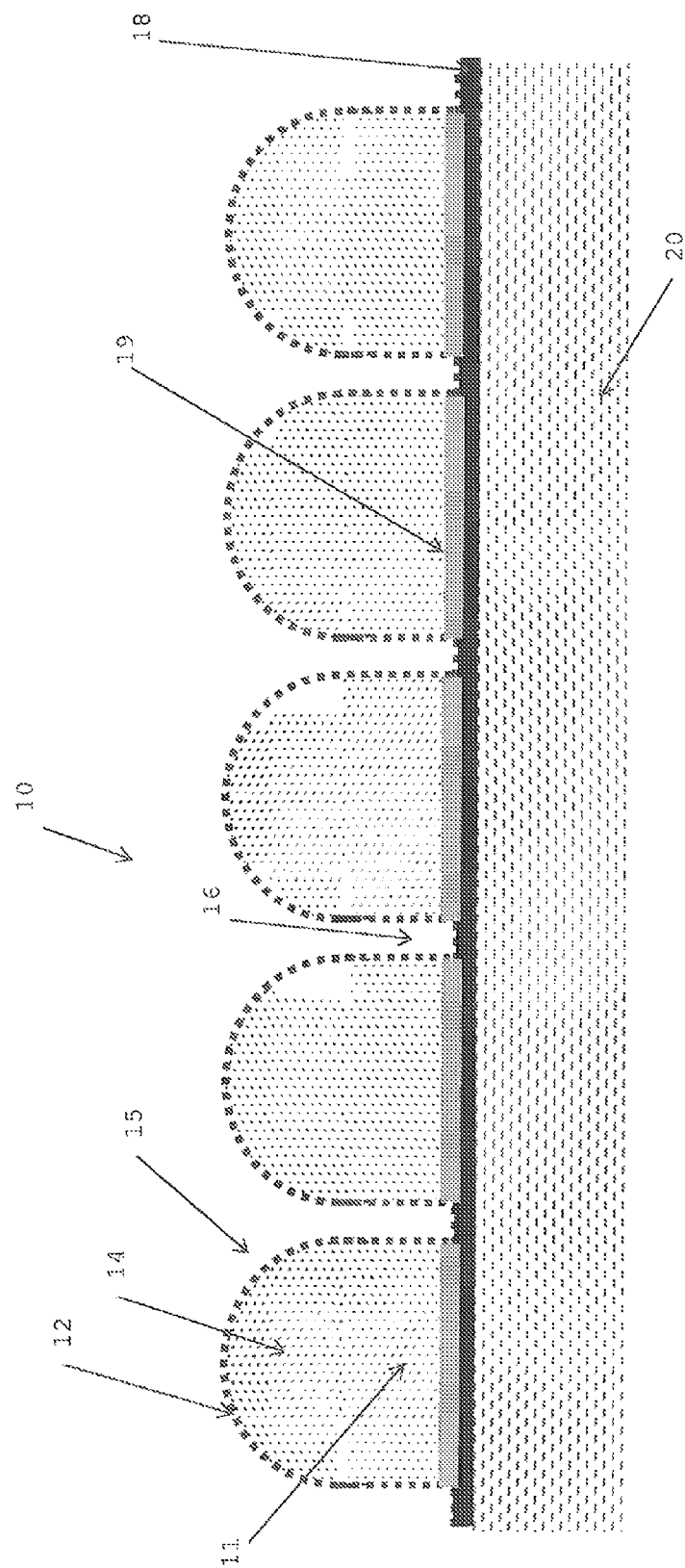
Figure 4A:
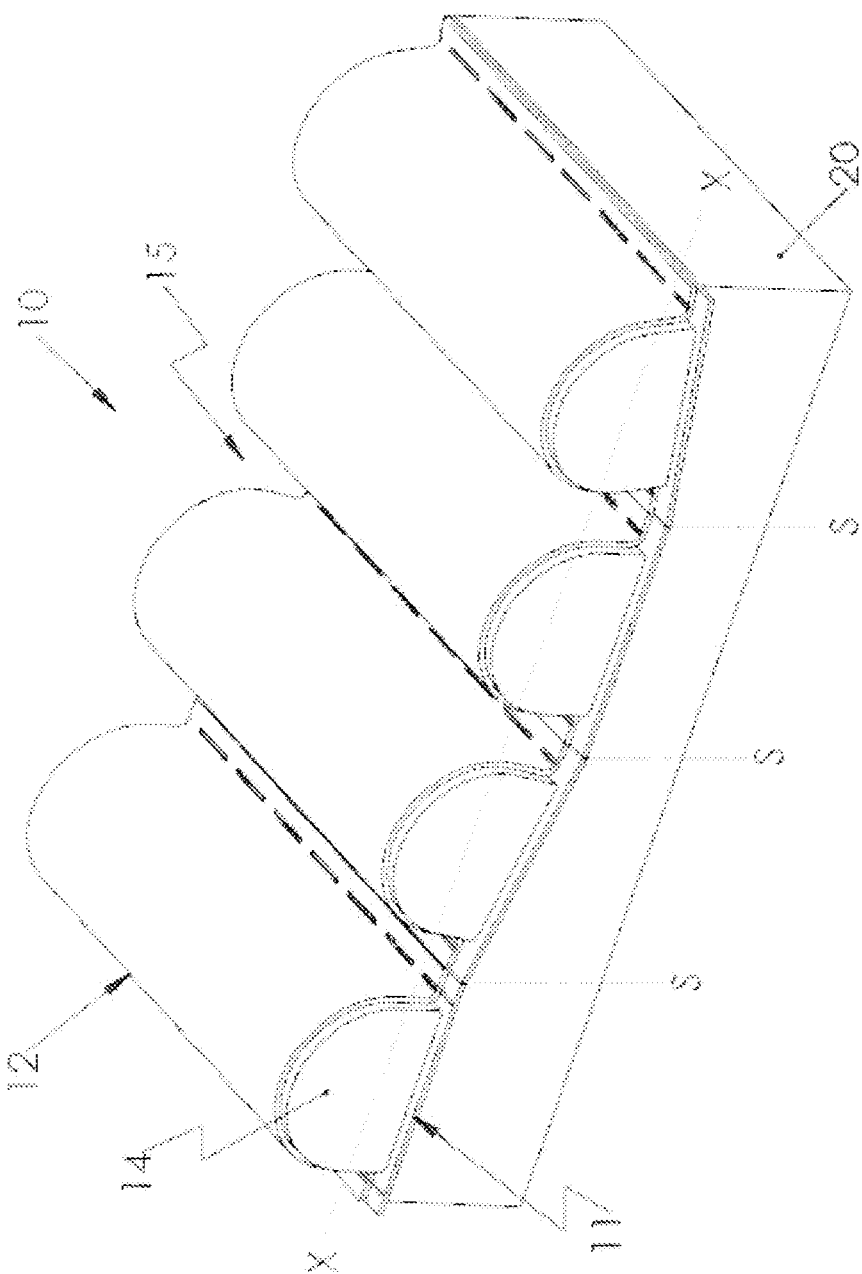
Figure 4B:
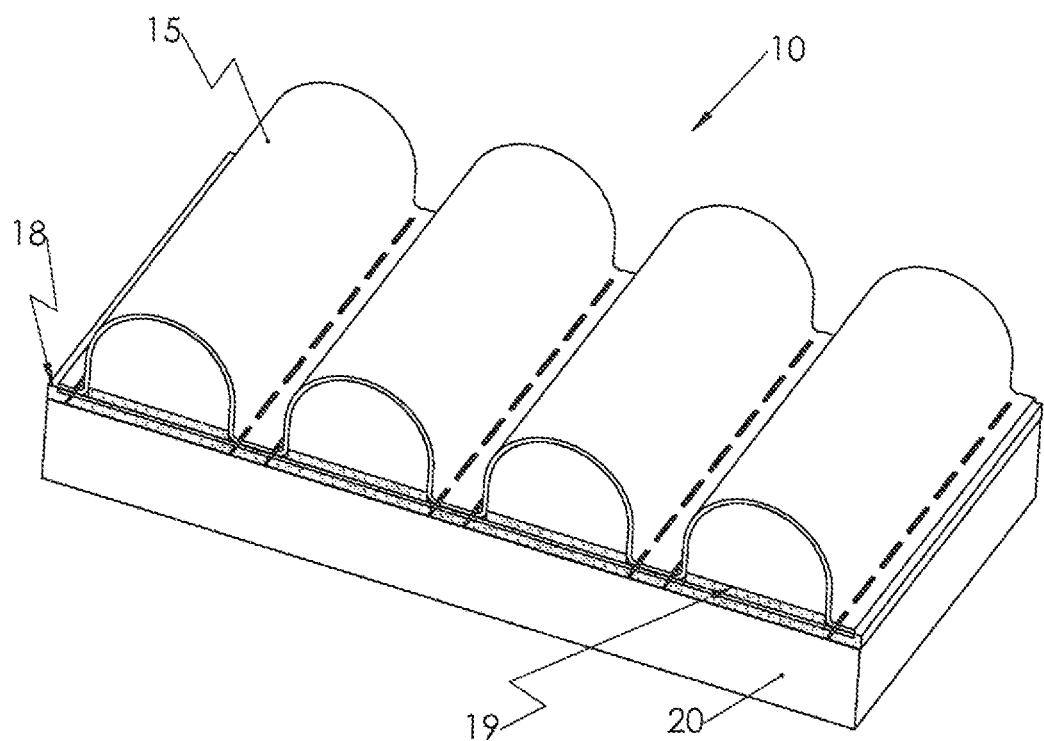
FIG. 4b, FIG. 4c and FIG. 4d show accordingly isometric projections of embodiments of oil absorbent pad for absorbing oil on water, showing that as the pad absorbs oil it partially submerges into the water by gravity.

When the device is placed on the surface of water 20 (FIG. 3a) it floats on the water surface 20 indefinitely without absorbing water, since the absorbent core material is highly hydrophobic. Referring to FIG. 3b and FIG. 4b, when pad 10 is brought into contact with oil 18 located on the surface of the water 20, it absorbs the oil up through its bottom fabric 11.

The absorbed oil 19 fills the bottom part of the modules 15 causing the pad 10 to submerge into water, since the weight of the pad is increased. As pad 10 lowers into the water, the oil 18 residing under the pad and surrounding the pad, flows up through the channels 16 between sorbent modules 15, and is absorbed through the side surfaces of the modules and fills the modules (FIG. 3c, FIG. 3d and accordingly FIG. 4c, FIG. 4d). As the pad 10 absorbs the oil sandwiched between the adjacent modules 15, new oil flows up through channels 16 into the region between modules 15. As the pad 10 absorbs oil it submerges or lowers down into the water under the force of gravity of the absorbed oil. The modules 15 are always in contact with surrounding oil as illustrated in FIG. 3c, FIG. 3d and FIG. 4c, FIG. 4d.

Figure 3C:
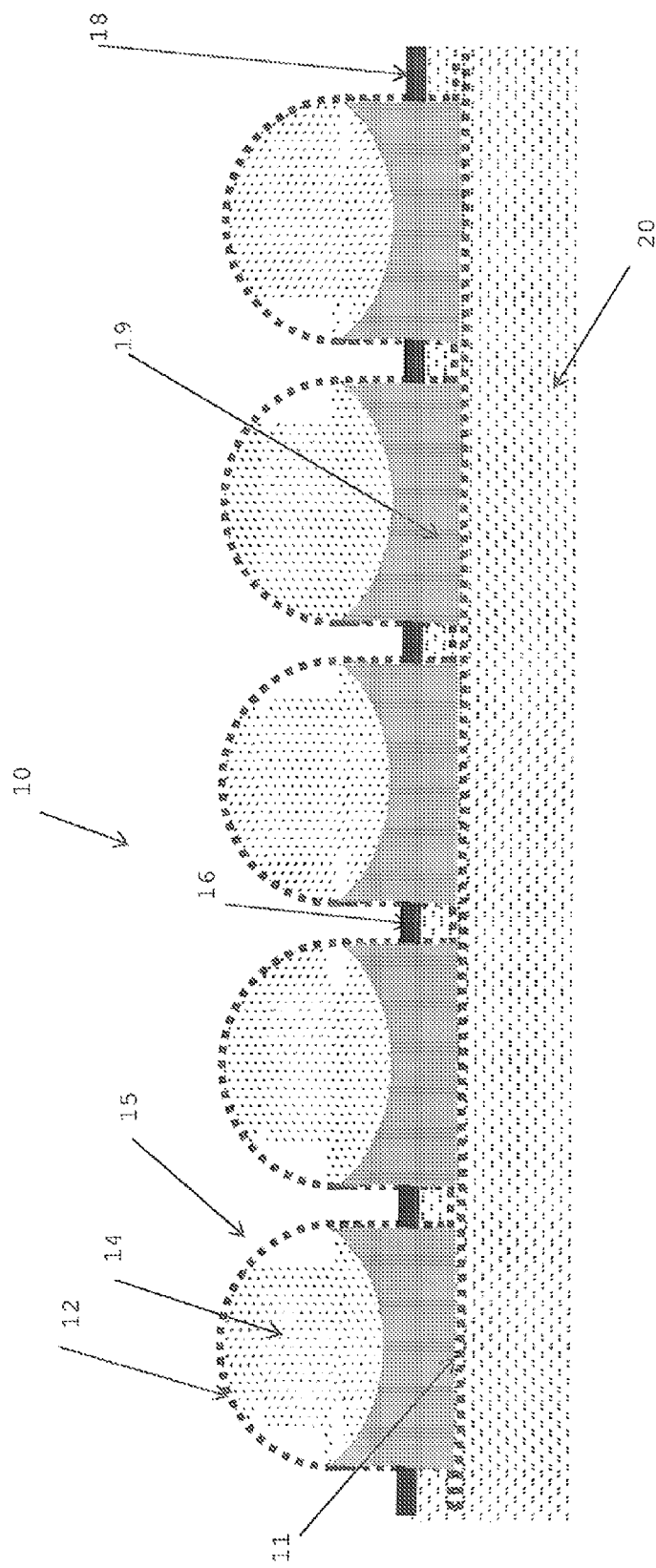
Figure 4C:
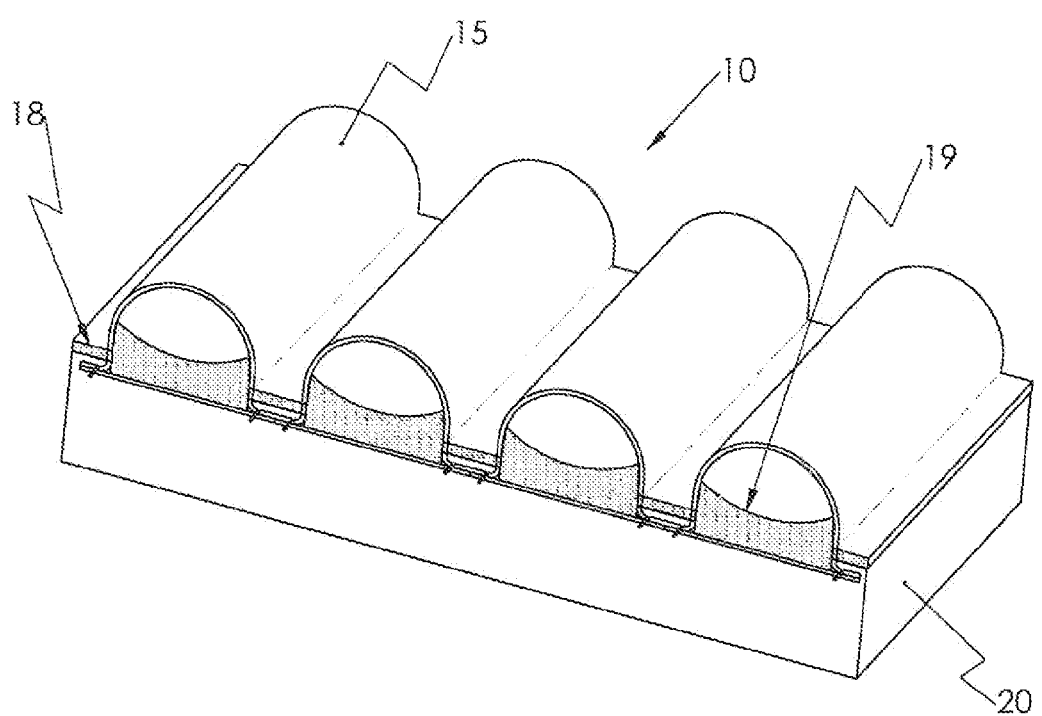
Figure 4D:
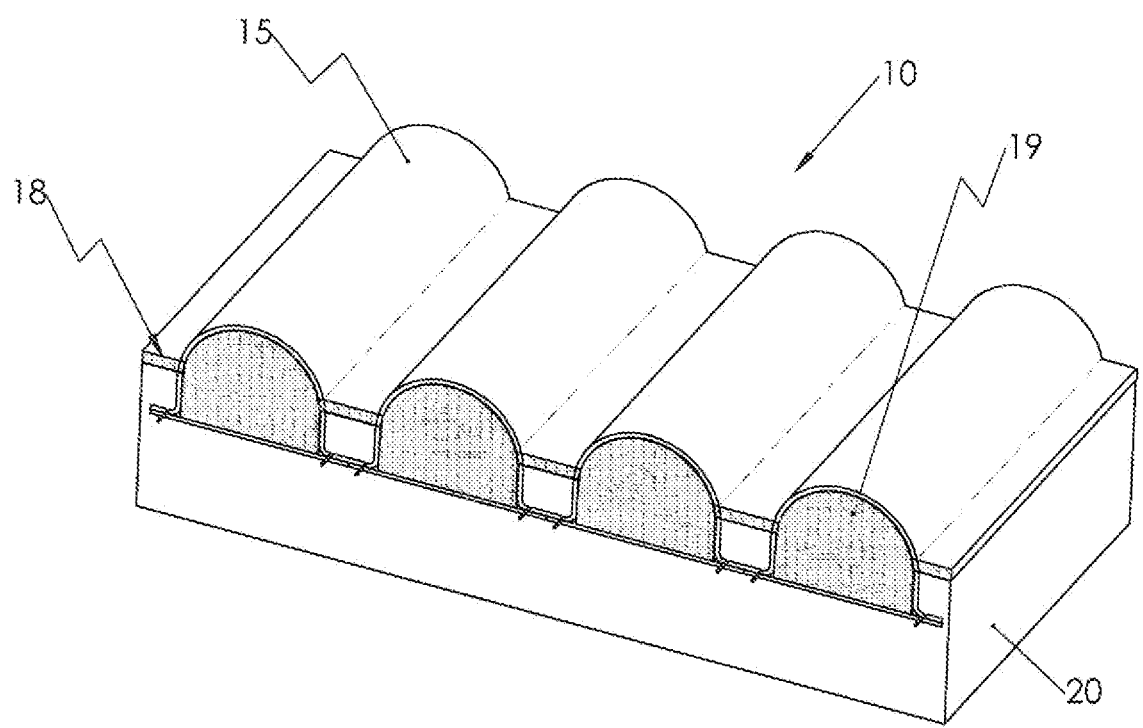

The cross sectional area of the absorbed oil is denoted by 19 through FIG. 3b, FIG. 3c, FIG. 3d. and FIG. 4b, FIG. 4c, FIG. 4d, and it may be seen in these Figures that as pads 10 absorb oil and the weight of the pad 10 is increased, the pad is submerged deeper into the water until the modules 15 are completely filled with the oil. Pad 10 floats indefinitely long after absorbing oil.

In both above mentioned cases (oil on a solid surface and on water), oil, after egressing up through channels 16 between the sorbent modules 15 penetrates into the pad 10 through area defined by length of oil line around the edges of each module 15 multiplied by thickness of the oil layer and multiplied by number of sorbent modules 15. Thus the area of oil penetration into pad 10 is larger than the area of oil penetration into the known devices in number of times equal to the number of the sorbent modules 15 contained within pad 10. Accordingly, the speed of oil absorption by pad 10 is higher than the speed of oil absorption by known devices over the same amount of time.

The sorbent modules 15 may have cross sections that are, but not limited to hemispherical, triangular, rectangular, square, or any other regular geometric shape with a planar base formed by an associated area of the base 11. The base cross-sectional width and height of the modules 15 can be varied, depending on the preferred amount of time required to completely fill the modules with oil. Non-limiting examples of such dimensions include modules 15 in the range from about ¼ inch to about 10 inches, ⅜ inch to about 5 inches, or in the range of about 1 inch to about 2 inches, to mention just a few.

The distance between the modules 15, (the gap defined by the channel 16), depending on viscosity of the oil being absorbed, may be in the range from about 1/16 inch to about 4 inches. In another embodiment the distances between the modules 15 may be in the range of ⅛ inch to about 2 inches. In yet another embodiment the distances between the modules 15 are in the range from about ¼ inch to about 1 inch.

The hydrophobic, porous and flexible casing material, namely, the base and top fabrics may be made from any one or combination of polymers, natural fibers and meshes. The hydrophobic, porous and flexible casing material may be spunbound polypropylene or spunbound polyester to mention some non-limiting examples. The hydrophobic, oil absorbent material may be hydrophobic fibers selected from the group consisting of natural fibers, polymer fibers, and any mixture thereof. The hydrophobic, oil absorbent material may be fibers made of minerals such as, but not limited to, treated perlite, vermiculite, sepilolite and diatomite. The hydrophobic, oil absorbent material may be peat moss. The hydrophobic, oil absorbent material may be selected from the group consisting of natural Kenaf fibers. The hydrophobic, oil absorbent material may include hydrophobized cellulose fibers, or cotton waste fibers. The hydrophobic, oil absorbent material may include polymer fibers such as, but not limited to, polypropylene and polyethylene fibers.

Considering that the proposed and the known devices have similar overall dimension and accordingly comparable total cross section areas, the oil has essentially a shorter pathway to the center of the modules 15 compared to the pathway for oil entering known oil absorbent devices. This means that the volume of the present pads 10 can be filled with oil more quickly and more completely than occurs with known absorbent devices with the same overall dimension so that pads 10 have a higher oil sorption rate and higher oil sorption capacity than the known devices.

In addition to the above-noted advantages, the present absorbent pads 10 exhibit additional advantages in comparison with known absorbent devices. As illustrated in the FIG. 3a and FIG. 3e, the plane containing the centers of gravity of the modules 15, (denoted by line X in the FIG. 3a and FIG. 3e) is offset from the plane defined by the planar bottom 11 (when pad 10 is on a flat surface so that bottom is 11 is flat) which contains centers of twist (denoted by points A in FIG. 3a and FIG. 3e) of the modules 15 connected to each other, so that there is a vertical distance y (FIG. 3a) between the plane X containing the centers of gravity of the modules 15 and the planar base 11 (which contains the centers of twist A of the modules 15).

Figure 3E:
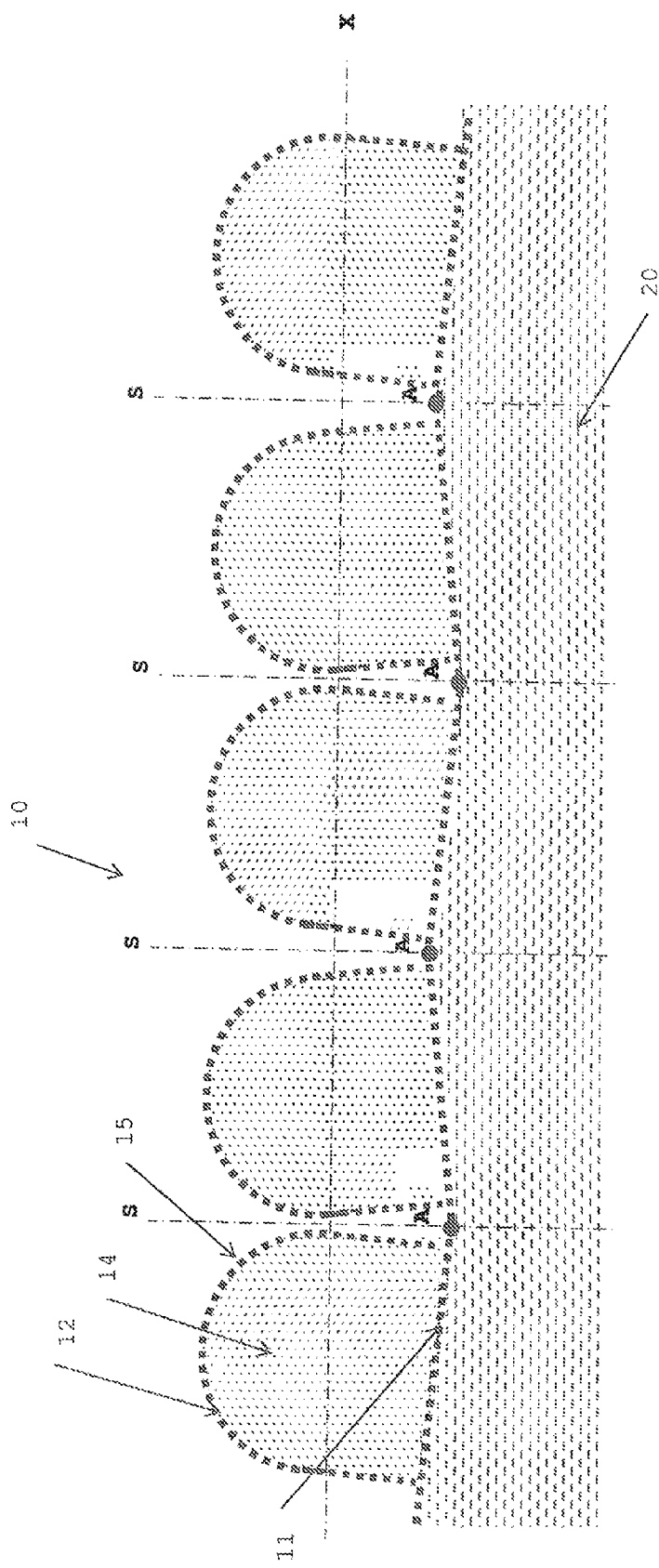
FIG. 3e is cross-sectional view and FIG. 4a is isometric projection of oil absorbent pad and these Figures show behavior of the absorbent pad on water which has waves.

This means that the absorbent modules 15 are in a state of mechanical equilibrium, wherein if small perturbations shift the position of modules, they tend to restore back the equilibrium position. Thus as illustrated in FIG. 3e, if the body of water is even slightly rough with waves on which the pad 10 is located, this will cause rotary oscillations of each sorbent module 15 around its center of twist. The centers of twist (denoted by points A in the FIG. 3a and FIG. 3e) are located on the intersection of vertical axis S passing through center of the channel 16 and bottom fabric 11. These oscillations will act to increase speed of oil sorption located in channels 16 between sorbent modules 15 (oil is not shown in FIG. 3a, FIG. 3e and FIG. 4a). Increased oil sorption is promoted by more active exposure of the vibrating surfaces of modules 15 to surrounding oil, since level of the oil, sandwiched between the modules 15 will periodically rise as the modules 15 move closer one to another, and will periodically drop as the modules 15 move farther from each other.

Further, increased oil sorption is facilitated by a "pumping effect" caused by periodical squeezing oil in the channels 16 due to the changing distances between modules 15 during oscillation and twisting of the modules. If oil penetration in all known sorbents and sorbent devices happens mainly by capillary forces and to a small extent by hydrostatic pressure, the periodical oil squeezing in the device of the present invention creates some additional hydrodynamic pressure, which speeds up oil sorption.

The pad 10 disclosed herein has a bottom flexible material 11 that conforms to the surface on which it is sitting so that there is full contact between bottom surface 11 and the water surface and surface 11 conforms to any wave motion to maintain full contact. The pad 10 having this full contact between the bottom surface 11 is advantageous over oil absorbent pads having bottom surfaces that do not fully conform (e.g. convex downward etc.) for the following reasons. Comparing pad 10 to a structure, of the same weight, material and overall size as pad 10, that does not have full contact with the water surface, when placed on the surface, will submerge deeper than pad 10 due to the smaller surface area in contact with the water compared to the larger surface area of pad 10 in contact. The surface 11 of pad 10, having a higher surface area in contact with the water, place less pressure on the water compared to the convex downward structure which places more pressure on the water due to the lower surface area in contact with the liquid, hence it submerges more deeply into the water than pad 10.

When oil is present on the surface of the water, pad 10 submerges less and maintains full contact with the oil layer while the pad with the convex downward structure submerges below the oil layer into the water thereby reducing the area of contact between the oil layer and the pad which reduces the rate oil uptake.

The oil absorbent pads 10 disclosed herein may include grommets or fasteners mounted on the casing or fabric material so that multiple pads 10 can be assembled together into a larger sorbent mat structure.

EXAMPLES

The following non-limiting Examples 1 through 6 are to illustrate non-limiting exemplary methods to make the sorbent pads 10 and shows test results compared with known sorbent pads.

Example 1

Standard "Oil Only" cotton pad 16"×18"×0.25" (denoted by C) from Chemtex (Cumberland, R.I.) is placed on the oil layer (oil thickness about 0.5") covering water. Motor oil 10W-30 (accepted as a standard for lab oil sorption tests) was used in the test. The results of the tests are shown in the Table 1.

Example 2

Oil sorbent pad, representing parallelepiped with overall sizes 14"×18"×1" is made according to the description in the U.S. Pat. No. 5,186,831 and U.S. Pat. No. 5,407,575. The casing of the pad is made from spun bound polypropylene (basis weight of 1.25 oz./yd$^2$) from Carriff (Midland, N.C.), and filled with hydrophobic raw cotton ginning waste from Jasztex (Montreal, QC).

The pad (denoted by SP×1") is placed on the oil layer (oil thickness about 0.5") covering water. Motor oil 10W-30 (accepted as a standard for lab oil sorption tests) was used in the test. The results of the tests are shown in the Table 1.

Example 3

Oil sorbent pad, representing parallelepiped with overall sizes 14"×18"×2" is made according to the description in the U.S. Pat. No. 5,186,831 and U.S. Pat. No. 5,407,575. The casing of the pad is made from spun bound polypropylene (basis weight of 1.25 oz./yd$^2$) from Carriff (Midland, N.C.), and filled with hydrophobic raw cotton ginning waste from Jasztex (Montreal, QC).

The pad (denoted by SP×2") is placed on the oil layer (oil thickness about 0.5") covering water. Motor oil 10W-30 (accepted as a standard for lab oil sorption tests) was used in the test. The results of the tests are shown in the Table 1.

Example 4

Referring to FIG. 1a and FIG. 2a two layers of porous spun bound polypropylene fabric—bottom 11 and top 12 (both with basis weight of 1.25 oz./yd$^2$) from Carriff (Midland, N.C.) are laid together and fastened one to another by the stitched parallel seams 13. The spaces or pockets, formed between fabrics 11 and 12 between the seams 13 are filled with hydrophobic absorbent fibers 14, namely raw cotton ginning waste from Jasztex (Montreal, QC) so that the filled pockets make sorbent modules 15. The opened edges of the pockets, after they have been filled, are sealed.

The resulting absorbent pad is formed with five modules 15 each with cross sectional base width and height 2", distances between adjacent modules 0.5" and overall sizes 14"×18".

The pad (denoted by IS 2"×5) is placed on the oil layer (oil thickness about 0.5") covering water. Motor oil 10W-30 (accepted as a standard for lab oil sorption tests) was used in the test. The results of the tests are shown in the Table 1.

Example 5

Referring to FIG. 1a and FIG. 2a two layers of porous spun bound polypropylene fabric—bottom 11 and top 12 (both with basis weight 1.25 oz./yd$^2$) from Carriff (Midland, N.C.) are laid together and fastened one to another by the stitched parallel seams 13. The spaces or pockets, formed between fabrics 11 and 12 between the seams 13 are filled with hydrophobic absorbent fibers 14, namely raw cotton ginning waste from Jasztex (Montreal, QC) to form the sorbent modules 15. The opened edges of the modules 15, after they have been filled, are thereby sealing the sorbent modules 15.

The resulting absorbent pad is formed with six modules 15 each with cross sectional base width and height 1.5", distance between adjacent modules 0.5" and overall size 14"×18".

The pad (denoted by IS 1.5"×6) is placed on the oil layer (oil thickness about 0.5") covering water. Motor oil 10W-30 (accepted as a standard for lab oil sorption tests) was used in the test. The results of the tests are shown in the Table 1.

Example 6

Referring to FIG. 1a and FIG. 2a two layers of porous spun bound polypropylene casings, bottom 11 and top 12 (both with basis weight 1.25 oz./yd$^2$) from Carriff (Midland, N.C.), are laid together and fastened one to another by the stitched parallel seams 13. The spaces or pockets, formed between fabrics 11 and 12 between the seams 13 are filled with hydrophobic absorbent fibers 14, namely raw cotton ginning waste from Jasztex (Montreal, QC) to form the sorbent modules 15. The opened edges of the pockets, after they have been filled, are sealed thereby sealing the sorbent modules 15.

The resulting absorbent pad is formed with nine modules 15 each with cross sectional base width and height 1", distances between adjacent modules 0.5" and overall sizes 14"×18".

The pad (denoted by IS 1"×9) is placed on the oil layer (oil thickness about 0.5") covering water. Motor oil 10W-30 (accepted as a standard for lab oil sorption tests) was used in the test. The results of the tests are shown in the Table 1.

Referring to data in the Table 1, the standard pad C was filled with oil completely in four minutes. Within this time the pad absorbed 614 gram oil and its oil recovery (weight, grams of absorbed oil divided by weight, grams of the dry pad) is 9.6.

The time for filling with oil completely the pads SP×1" and SP×2" (made according to the description in the U.S. Pat. No. 5,186,831 and U.S. Pat. No. 5,407,575) was so long that the test was stopped after two hours, and within two hours the pads SP×1" and SP×2" absorbed accordingly 1313 grams and 2577 grams oil and their oil recovery was accordingly 9.2 and 10.3.

The absorbent pad IS 1"×9 disclosed herein filled with oil completely in five minutes, absorbed 1722 grams oil and its oil recovery was 13.7.

The absorbent pad IS 1.5"×6 disclosed herein filled with oil completely in nine minutes, absorbed 2186 grams oil and its oil recovery was 14.8.

The absorbent pad IS 2"×5 disclosed herein filled with oil completely in 15 minutes, absorbed 3438 grams oil and its oil recovery was 15.6.

TABLE 1

| Pads | Pad dry weight gram | Time to fill pad Completely with oil | Pad weight with oil gram | Oil absorbed weight gram | Oil Recovery gram/gram |
|---|---|---|---|---|---|
| C | 64 | 4 min | 678 | 614 | 9.6 |
| SP × 1" | 142 | 2 hours* | 1455 | 1313 | 9.2 |
| SP × 2" | 250 | 2 hours* | 3562 | 2577 | 10.3 |
| IS 1" × 9 | 126 | 5 min | 1848 | 1722 | 13.7 |
| IS 1.5" × 6 | 148 | 9 min | 2334 | 2186 | 14.8 |
| IS 2" × 5 | 220 | 15 min | 3658 | 3438 | 15.6 |

*test was stopped after 2 hours; the pad was not completely filled with oil

Based on the data in the TABLE 1 it may be concluded that the pads disclosed herein (IS 1"×9, IS 1.5"×6, IS 2"×5) fill with absorbed oil in time comparable with time of absorbing oil by standard nonwoven pad (C), and have oil absorption capacity (oil absorbed) and absorption efficiency (oil recovery) much higher than that of the standard nonwoven pad (C).

Based on the data in the TABLE 1 it may be concluded as well that the pads disclosed herein (IS 1"×9, IS 1.5"×6, IS 2"×5) absorb oil much faster than known pads (SP×1" and SP×2"), and have oil absorption capacity (oil absorbed) comparable to that of the known pads, and absorption efficiency (oil recovery) much higher than with pads (SP×1" and SP×2").

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. An absorbent pad for absorption and containment of oil based products, comprising:

a hydrophobic, porous, continuous and flexible surface conforming base, a plurality of spaced absorbent modules affixed to said hydrophobic, porous, continuous and flexible surface conforming base, each absorbent module having a hydrophobic oil absorbent material sealed between a hydrophobic, porous and flexible material and said surface conforming base, said hydrophobic, porous and flexible material defining a pair of sides and a top of each said module and said surface conforming base defining a bottom of each said module, the bottom of each said module being substantially planar and extending from one the sides of the respective module to the other side of the respective module, the side of each absorbent module being spaced from the side of an adjacent absorbent module by a gap of pre-selected width on said surface conforming base, the flexible surface conforming base including gap facing portions that extend across the gaps from the side of one of the modules to the side of an adjacent module, whereby the entire flexible surface conforming base including the gap facing portions can assume a substantially planar configuration when placed upon a substantially planar surface, said gaps being sufficiently large to allow said plurality of spaced absorbent modules to twist and flex with respect to each other along the gap facing portions of the flexible surface conforming base and to allow oil-based products to flow up through said gap between adjacent absorbent modules from the bottom of the modules to the to of the modules, centers of gravity of said plurality of modules being spaced upwardly from said surface conforming base, and said gap facing portions containing centers of twist of the said modules; and wherein when placed on a surface containing oil based products, said surface conforming base makes full contact with said surface and said oil based products pass through said hydrophobic, porous and flexible surface conforming base into said absorbent modules, and oil based products pass up through said gap between neighboring absorbent modules and passes into said absorbent modules through said hydrophobic, porous and flexible material through sides of said absorbent modules, and wherein water is blocked from entering said absorbent modules by said hydrophobic, porous and flexible surface conforming base and said hydrophobic, porous and flexible material.

2. The absorbent pad according to claim 1, wherein said hydrophobic, porous and flexible surface conforming base and said hydrophobic, porous and flexible material are made from the same material.

3. The absorbent pad according to claim 1, wherein said hydrophobic, porous and flexible surface conforming base and said hydrophobic, porous and flexible material are made from any one or combination of polymers, natural fibers and meshes.

4. The absorbent pad according to claim 1, said hydrophobic, porous and flexible surface conforming base and said hydrophobic, porous and flexible material are spunbound polypropylene.

5. The absorbent pad according to claim 1, wherein said hydrophobic, porous and flexible surface conforming base and said hydrophobic, porous and flexible material are spunbound polyester.

6. The absorbent pad according to claim 1, wherein said hydrophobic oil absorbent material includes hydrophobic fibers selected from the group consisting of natural fibers, polymer fibers, and any mixture thereof.

7. The absorbent pad according to claim 1, wherein said hydrophobic oil absorbent material is fibers made of minerals selected from the group consisting treated perlite, vermiculite, sepilolite and diatomite.

8. The absorbent pad according to claim 1, wherein said hydrophobic oil absorbent material is peat moss.

9. The absorbent pad according to claim 1, wherein said hydrophobic oil absorbent material includes natural Kenaf fibers.

10. The absorbent pad according to claim 1, wherein said hydrophobic oil absorbent material includes natural fibers are hydrophobized cellulose fibers.

11. The absorbent pad according to claim 1, wherein said hydrophobic oil absorbent material includes natural fibers are cotton waste fibers.

12. The absorbent pad according to claim 1, wherein said hydrophobic oil absorbent material includes polymer fibers selected from the group consisting of polypropylene and polyethylene fibers.

13. The absorbent pad according to claim 1, wherein said absorbent modules have a cross section which are any one of hemispherical, triangular, rectangular and square.

14. The absorbent pad according to claim 13, wherein the base cross-sectional width and height of the said absorbent modules are in the range from about 0.25 inches to about 10 inches.

15. The absorbent pad according to claim 13, wherein the base cross-sectional width and height of the said absorbent modules are in the range from about 0.5 inches to about 5 inches.

16. The absorbent pad according to claim 13, wherein the base cross-sectional width and height of the said absorbent modules are in the range from about 1 inch to about 2 inches.

17. The absorbent pad according to claim 1, wherein said gap defining a distance between neighboring absorbent modules is in a range from about 1/16 inch to about 4 inches.

18. The absorbent pad according to claim 1, wherein said gap defining a distance between neighboring absorbent modules is in a range from about 1/8 inch to about 2 inches.

19. The absorbent pad according to claim 1, wherein said gap defining a distance between neighboring absorbent modules is in a range from about 1/4 inch to about 1 inch.

* * * * *

UNITED STATES PATENT AND TRADEMARK OFFICE
CERTIFICATE OF CORRECTION

| | | |
|---|---|---|
| PATENT NO. | : 9,045,875 B2 | Page 1 of 1 |
| APPLICATION NO. | : 13/760376 | |
| DATED | : June 2, 2015 | |
| INVENTOR(S) | : Alexander Ozersky | |

It is certified that error appears in the above-identified patent and that said Letters Patent is hereby corrected as shown below:

Specification

In column 2, under the Summary heading, line 21 should be amended to read:
--surface conforming base defining a bottom of each said--

In column 5, line 42 should be amended to read:
--about 1/4 inch to about 10 inches, 1/2 inch to about 5 inches, or--

Claims

In column 10, claim 1, line 5 should be amended to read:
--modules from the bottom of the modules to the top of the--

Signed and Sealed this
Twenty-ninth Day of March, 2016

Michelle K. Lee
*Director of the United States Patent and Trademark Office*